(12) United States Patent
Zaizen et al.

(10) Patent No.: US 10,319,347 B2
(45) Date of Patent: Jun. 11, 2019

(54) INDUSTRIAL VEHICLE MANAGEMENT SYSTEM

(71) Applicant: HITACHI CONSTRUCTION MACHINERY CO., LTD., Tokyo (JP)

(72) Inventors: Yasumasa Zaizen, Tondabayashi (JP); Hiroyuki Adachi, Tsuchiura (JP); Jyunji Ichikawa, Saitama (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/605,072

(22) Filed: May 25, 2017

(65) Prior Publication Data

US 2017/0263213 A1 Sep. 14, 2017

Related U.S. Application Data

(63) Continuation of application No. 14/399,838, filed as application No. PCT/JP2013/062715 on May 1, 2013, now abandoned.

(30) Foreign Application Priority Data

May 10, 2012 (JP) ................... 2012-108411

(51) Int. Cl.
*G09G 5/377* (2006.01)
*G07C 5/00* (2006.01)
*E02F 9/20* (2006.01)
*E02F 9/26* (2006.01)
*G06T 11/60* (2006.01)
(Continued)

(52) U.S. Cl.
CPC ........... *G09G 5/377* (2013.01); *E02F 9/2054* (2013.01); *E02F 9/261* (2013.01); *E02F 9/267* (2013.01); *G06T 11/00* (2013.01); *G06T 11/60* (2013.01); *G07C 5/008* (2013.01); *G09G 5/30* (2013.01); *G06T 2210/32* (2013.01); *G07C 5/006* (2013.01); *G09G 2320/08* (2013.01); *G09G 2320/10* (2013.01); *G09G 2340/12* (2013.01);

(Continued)

(58) Field of Classification Search
CPC ................. G08G 1/13; E02F 9/20; E02F 9/26
See application file for complete search history.

(56) References Cited

U.S. PATENT DOCUMENTS 7,283,810 B1 10/2007 Arakawa
2003/0132944 A1 7/2003 Smith
(Continued)

FOREIGN PATENT DOCUMENTS

| JP | 2002-024341 A | 1/2002 |
|----|----|----|
| JP | 2002-358598 A | 12/2002 |
| WO | 2001/73220 A1 | 10/2001 |

*Primary Examiner* — Weiming He
(74) *Attorney, Agent, or Firm* — Mattingly & Malur, PC

(57) ABSTRACT

An industrial vehicle management system includes: a receiving unit that acquires operational information specifying a position and an operational state of each of a plurality of industrial vehicles; a symbol combining unit that, based on the operational information received by the receiving unit, superimposes and combines upon a map symbols showing the position of each of the industrial vehicles; a display control unit that displays upon a display device a map image that has been superimposed and combined by the symbol combining unit; and a symbol processing unit that changes display formats of the symbols according to the operational state.

2 Claims, 9 Drawing Sheets

(51) Int. Cl.
  *G09G 5/30* (2006.01)
  *G06T 11/00* (2006.01)
(52) U.S. Cl.
  CPC ..... *G09G 2340/14* (2013.01); *G09G 2380/10* (2013.01)

(56) References Cited

U.S. PATENT DOCUMENTS

| | | | | |
|---|---|---|---|---|
| 2007/0159355 A1* | 7/2007 | Kelly | ................ | G01C 21/3694 340/905 |
| 2012/0259540 A1 | 10/2012 | Kishore | | |
| 2013/0174259 A1* | 7/2013 | Pearcy | ................ | H04L 41/0893 726/25 |

* cited by examiner

FIG.6

| NO. | LOCATION | VEHICLE ID | HOUR METER | MAINTENANCE COST | CUMULATIVE NUMBER OF WARNINGS |
|---|---|---|---|---|---|
| 000001 | X1Y1 | XXXXXX | 1312 | YYYY | G |
| 000002 | X2Y2 | XXXXXX | 2455 | ZZZZ | F |
| 000003 | X3Y3 | YYYYY | 3232 | PPPP | K |
| 000004 | X4Y4 | XXXXXX | 790 | GG | I |
| ... | ... | ... | ... | ... | ... |

47

INDUSTRIAL VEHICLE MANAGEMENT SYSTEM

CROSS REFERENCE TO RELATED APPLICATION

This application is a continuation application of U.S. Ser. No. 14/399,838, filed Nov. 7, 2014, the entirety of the contents and subject matter of all of the above is incorporated herein by references.

TECHNICAL FIELD

The present invention relates to an industrial vehicle management system.

BACKGROUND ART

A management system is per se known that, from a plurality of construction machines, collects position information, operational information, anomaly information, or the like from each of the vehicles (refer to Patent Document #1).

CITATION LIST

Patent Literature

Patent Document #1: International Publication WO2001/073220.

SUMMARY OF INVENTION

Technical Problem

With this prior art technique, there is the problem that the information required for providing services for each of the vehicles is difficult to understand, since a large quantity of information is collected as the number of construction machine vehicles increases.

Solution to Technical Problem

According to the 1st aspect of the present invention, an industrial vehicle management system, comprises: a receiving unit that acquires operational information specifying a position and an operational state of each of a plurality of industrial vehicles; a symbol combining unit that, based on the operational information received by the receiving unit, superimposes and combines upon a map symbols showing the position of each of the industrial vehicles; a display control unit that displays upon a display device a map image that has been superimposed and combined by the symbol combining unit; and a symbol processing unit that changes display formats of the symbols according to the operational state.

According to the 2nd aspect of the present invention, in the industrial vehicle management system according to the 1st aspect, it is preferred that: the operational information includes at least operating hours and maintenance costs; and the symbol processing unit changes the display formats of the symbols according to the operating hours or the maintenance costs.

According to the 3rd aspect of the present invention, in the industrial vehicle management system according to the 2nd aspect, it is preferred that: the industrial vehicle management system further comprises a restriction unit that restricts corresponding industrial vehicles to a predetermined hour band among the operating hours, or to predetermined costs among the maintenance costs; and the symbol combining unit superimposes and combines upon the map, only symbols indicating the corresponding industrial vehicles restricted by the restriction unit.

According to the 4th aspect of the present invention, in the industrial vehicle management system according to the 3rd aspect, it is preferred that: the operational information further includes information specifying a type of each of the industrial vehicles, an empty weight of each of the industrial vehicles, an entity in charge of maintenance of each of the industrial vehicles, an operating time of each of the industrial vehicles, an area in which each of the industrial vehicles is located, and the number of warnings issued from each of the industrial vehicles; the restriction unit restricts the corresponding industrial vehicles based on at least one of the type of each of the industrial vehicles, the empty weight of each of the industrial vehicles, the entities in charge of maintenance of each of the industrial vehicles, the operating time of each of the industrial vehicles, the area in which each of the industrial vehicles is located, and the number of warnings issued from each of the industrial vehicles; and the symbol combining unit superimposes and combines upon the map, only symbols indicating the corresponding industrial vehicles restricted by the restriction unit.

According to the 5th aspect of the present invention, in the industrial vehicle management system according to any one of the 1st through 4th aspects, it is preferred that the symbol combining unit superimposes and combines, over another symbol, a symbol indicating an industrial vehicle for which a value denoting the operational state is greater.

Advantageous Effects of Invention

According to the present invention, it is possible to provide an industrial vehicle management system that assists with supply of precise services to each vehicle.

BRIEF DESCRIPTION OF DRAWINGS

FIG. 6 is a figure showing an example of a database;

DESCRIPTION OF EMBODIMENTS

Figure 1:
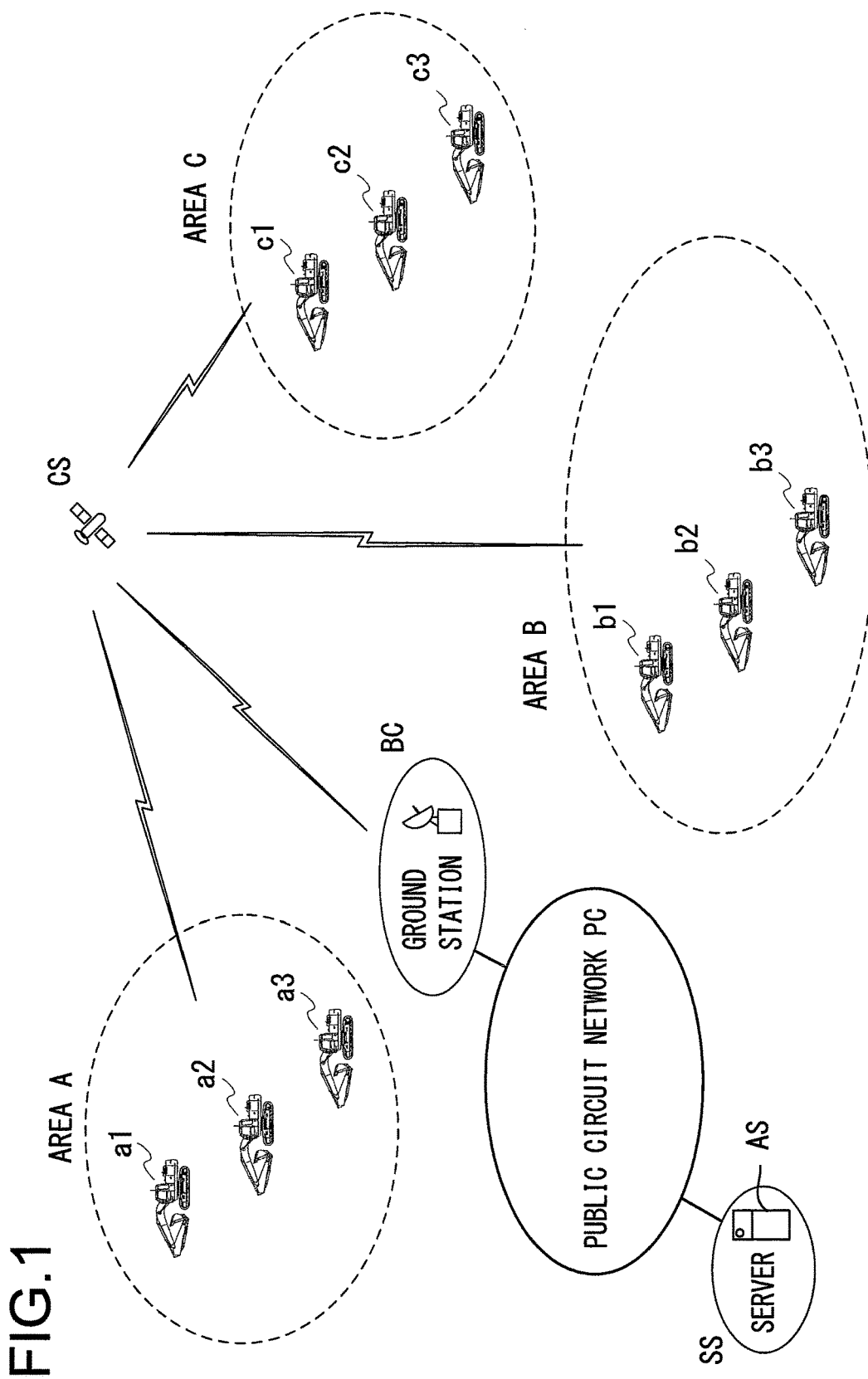
FIG. 1 is a figure showing the overall structure of a construction machine management system according to an embodiment of the present invention.

Embodiments will now be described and explained with reference to the drawings. FIG. 1 is a figure showing an example of the overall structure of a construction machine management system according to an embodiment of the present invention. In FIG. 1, a plurality of hydraulic excavators are operating in a plurality of areas A, B, and C. Hydraulic excavators a1 through a3 are present in area A; hydraulic excavators b1 through b3 are present in area B; and hydraulic excavators c1 through c3 are present in area C. The scopes of these areas may range from wards through towns, cities, counties (prefectures), and states, and may even be continents each including countries. The number of hydraulic excavators (vehicles) may be ten to a thousand, or even more.

Each of the hydraulic excavators detects the states of various sections within that hydraulic excavator, and transmits the detected information to a service center SS. In this embodiment, this information is sent from the hydraulic excavators via a communication satellite CS to a base station BC, and then is sent from the base station BC via a public circuit network PC to an analysis server AS of the service center SS. According to this structure, information from the hydraulic excavators at the various locations is collected by the service center SS. It should be understood that the communication from the hydraulic excavators to the base station is not limited to being satellite communication; various other means might be employed, such as mobile telephone communication, wireless LAN communication, or the like.

Apart from the information received from the excavators, the service center SS also keeps past maintenance information (inspection history, repair history, maintenance cost, and so on) for each of the hydraulic excavators described above. And, on the basis of the information collected from the hydraulic excavators and this past maintenance information, the analysis server AS of the service center SS displays a management screen that will be described hereinafter upon a display device.

Figure 2:
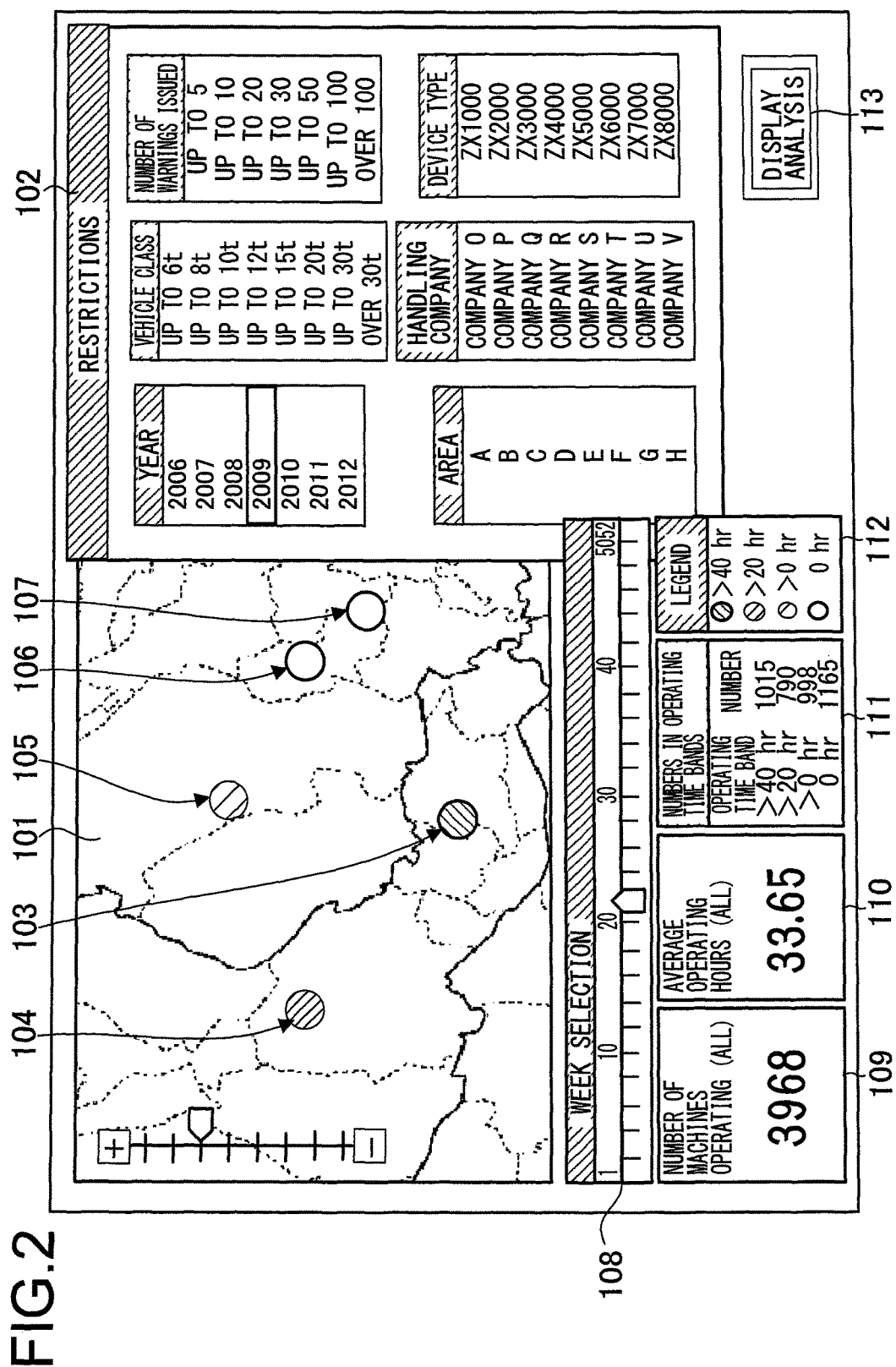
FIG. 2 is a figure showing an example of a map screen that specifies the operational states of hydraulic excavators.

FIG. 2 is a figure showing an example of a map screen displayed by the analysis server AS upon the display device, and indicating the operational states of the hydraulic excavators. In FIG. 2, a map 101 and a restriction tool window 102 are displayed upon the display screen. Symbols 103 through 107 denoting each of a number of hydraulic excavators are displayed as overlaid upon and combined with the map 101 at positions corresponding to the ground locations of those hydraulic excavators. In other words, a single symbol upon the map indicates a single hydraulic excavator that is working at that location. The scale at which the map 101 is displayed can also be changed. Moreover it is also possible to provide a restriction display corresponding to restriction conditions (for example, restriction by year, by hydraulic excavator (vehicle) class (i.e. by empty weight), by area, by company in charge of selling or maintaining each hydraulic excavator, by the types (models) of the hydraulic excavators, by number of warnings issued for each hydraulic excavator, or the like) provided in a restriction tool window 102.

If the restriction is performed by year, then a slider 108 for week selection is displayed upon the screen. When this week selection slider 108 is operated, the analysis server AS displays the operational states of the hydraulic excavators for the corresponding week upon the map 101. And the total number of all the operating hydraulic excavators that are subjected to the restriction condition is displayed in a window 109, and the average of the operating hours of the hydraulic excavators subjected to the restriction condition is displayed in a window 110. Moreover, an operating time band breakdown of the total number of operating units displayed in the window 109 (classified by the sizes of their cumulative operating hours in the corresponding week) is displayed in a window 111.

The symbols 103 through 107 displayed upon the map 101 are, for example, displayed while being superimposed and combined in different display formats for different bands of operating hours. In this embodiment, the display formats are varied by changing the colors in which the symbols are displayed. It would also be acceptable to arrange to change the sizes of the symbols according to the operating hours, or the brightnesses at which they are displayed, instead of changing the display colors. Due to the provision of this type of map screen display, it is possible for the manager of the service center SS to ascertain intuitively for how many hours each hydraulic excavator has been operating, wherever the hydraulic excavator may be, and at any timing.

The structure of the hydraulic excavators included in this construction machine management system, the structure of the ground station BC, and the structure of the analysis server AS will be explained in further detail hereinafter.

<The Hydraulic Excavators>

Figure 3:
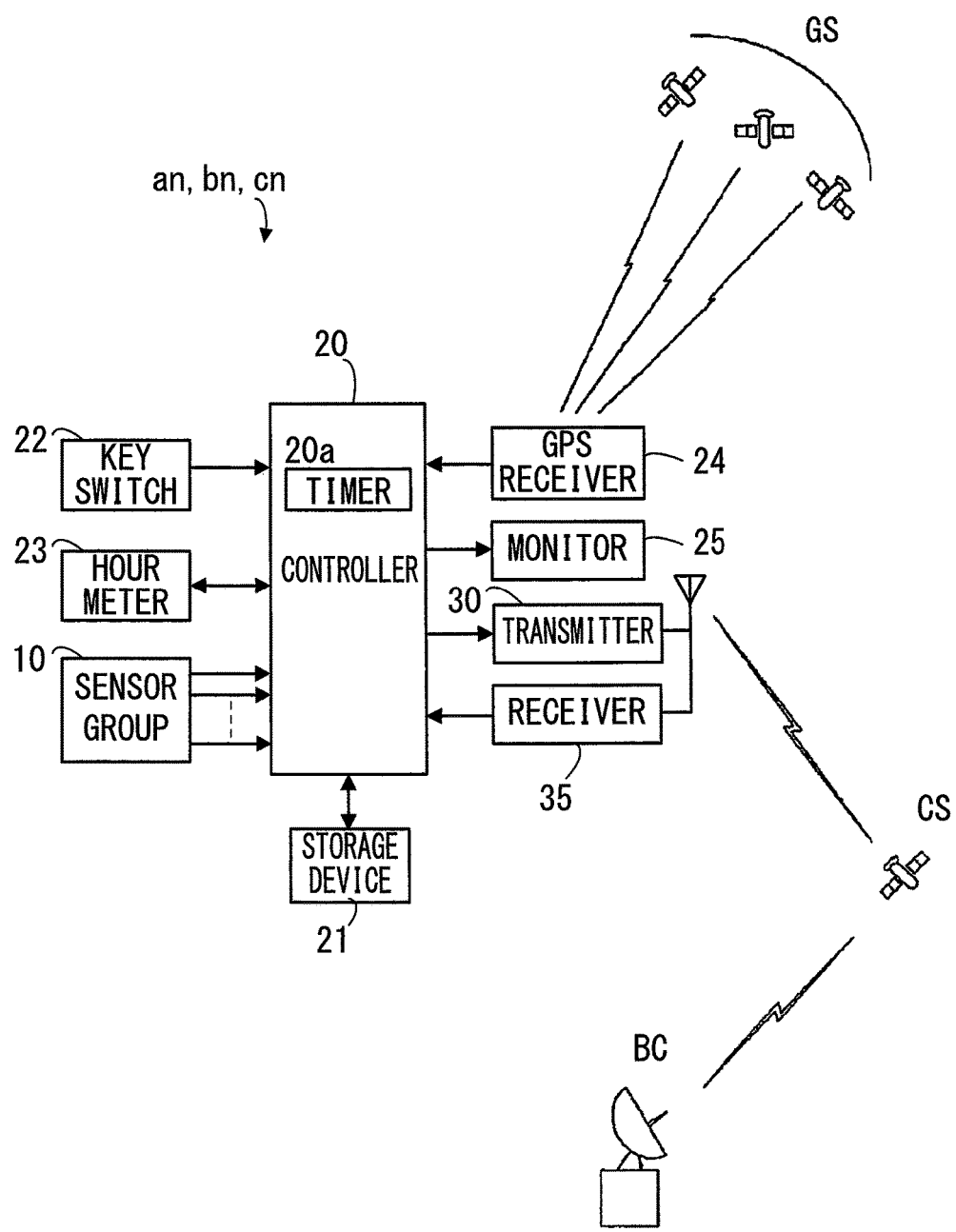
FIG. 3 is a block diagram for explanation of the structure of principal portions of one of the hydraulic excavators.

FIG. 3 is a block diagram for explanation of the structure of the principal portions of one of the hydraulic excavators an, bn, and cn of FIG. 1. To each of these hydraulic excavators, there is mounted a sensor group 10 that detects various conditions and operational states of various parts of the excavator, such as engine rotational speed, engine oil pressure, battery voltage, temperature of water in a cooling device, temperature of hydraulic fluid, amount of actuation of a front working device that includes a boom and an arm or the like, amount of pivoting operation, amount of traveling operation, the working loads upon working devices, and so on. The state detection signals from this sensor group 10 are read in by the controller 20 at predetermined timings.

The controller 20 comprises a timer unit 20a for adding the traveling operating hours, the pivoting operating hours, and the front (excavation) operating hours. The controller 20 calculates the traveling operating hours, the pivoting operating hours, and the front operating hours on the basis of the state detection signals that have been read in. These operating hours that have thus been calculated are stored in a storage device 21. Moreover, the hydraulic excavator comprises a key switch 22 that starts an engine not shown in the figures, and an hour meter 23 that measures the operating hours of the engine.

Furthermore, a GPS receiver 24 is mounted to the hydraulic excavator. This GPS receiver 24 receives GPS signals transmitted from GPS satellites GS, calculates position information for the hydraulic excavator (i.e. its location) on the basis of these GPS signals, and outputs this position information to the controller 20. A monitor 25 is provided at the driving seat of the hydraulic excavator, and displays information of various types.

On the basis of timer data provided by the timer unit 20a described above, the controller 20 detects the time point that the key switch 22 goes ON, the time point that it goes OFF, the time point that the engine starts, and the time point that the engine stops, and this time point information is also stored in the storage device 21. The controller 20 also reads in the value measured by the hour meter 23 at a predetermined timing, and stores it in the storage device 21.

The controller 20 sends a command to the transmitter 30 at a predetermined timing, such as at a set time point, or at intervals of a fixed number of hours, or when the engine is stopped or when it is started or the like, and wirelessly transmits the traveling hours, the pivoting hours, the front operating hours, and the time points when the key switch was turned ON and so on to the satellite CS along with position information and transmission time and date information. This information that has been transmitted from the transmitter 30 is received by the base station BC via the communication satellite CS. A receiver 35 is also connected to the controller 20. This receiver 35 receives information transmitted from the base station BC via the communication satellite CS, and sends it to the controller 20. Even when the main switch of the hydraulic excavator is OFF, the controller 20, the transmitter 30, and the receiver 35 are always kept in a state in which they are capable of communication by supply of power from an onboard battery (not shown in the figures).

The information described above indicating the states of various portions of the hydraulic excavator and specifying its operational state is normally transmitted from the hydraulic excavator to the service center SS once a day as a daily report, for example in a time band that is late at night. Moreover, information indicating an alarm or a fault or the like is transmitted from the hydraulic excavator to the service center SS as soon as it is detected. Furthermore, if the remaining amount of fuel has become a predetermined value or less, then the fact is transmitted from the hydraulic excavator to the service center SS immediately.

The controller 20 is, for example, adapted to issue an alarm in the following circumstances: if the engine oil level is not at a predetermined level; if the engine cooling water temperature is not a predetermined temperature; if the engine oil temperature is not a predetermined temperature; if clogging of the air filter has occurred; if clogging of the hydraulic filter has occurred; if the battery voltage is not a predetermined voltage; if the engine oil pressure is not a predetermined pressure; if the remaining fuel amount is not up to a predetermined amount; or if the hydraulic fluid temperature is not a predetermined temperature.

Moreover, the controller 20 determines that a fault has occurred in the following circumstances: if the engine rotational speed is greater than an anomaly decision threshold value; or if the hydraulic pump discharge pressure is greater than an anomaly decision threshold value.

<The Base Station BC>

Figure 4:
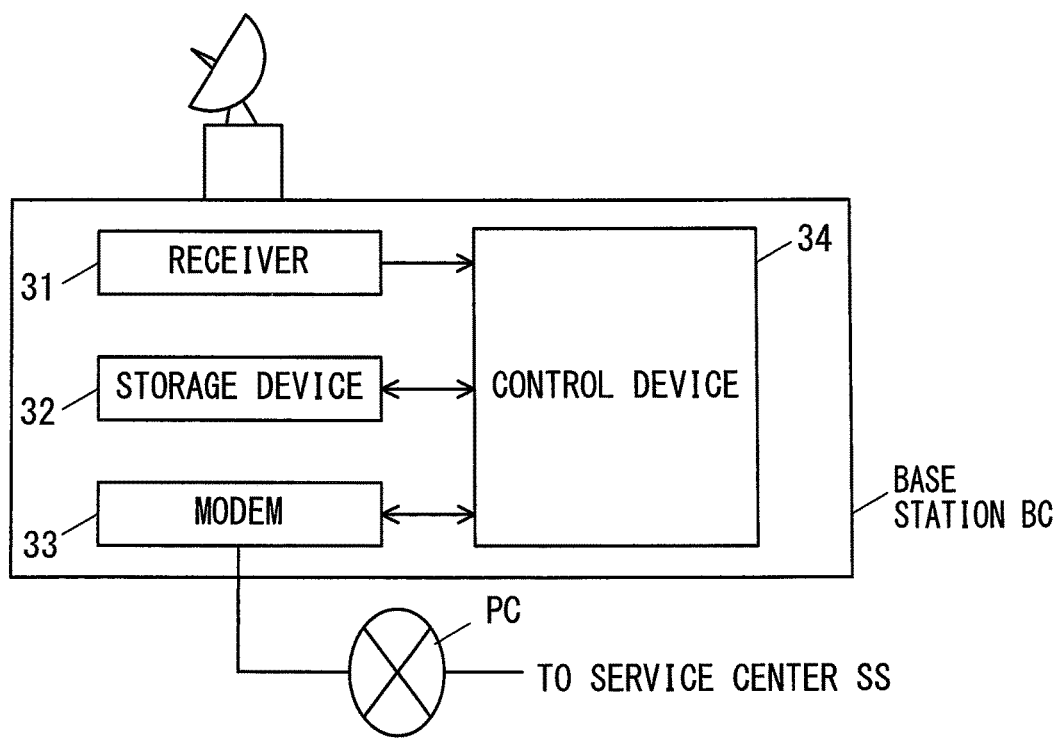
FIG. 4 is a block diagram showing an example of the structure of a base station.

FIG. 4 is a block diagram showing an example of the structure of the base station BC. The base station BC comprises a receiver 31 that receives radio waves transmitted and arriving from the communication satellite CS and that reconstructs the information transmitted from the hydraulic excavators (i.e. their operational information), a storage device 32 that temporarily stores the information reconstructed by the receiver 31, a modem 33 for transmitting this reconstructed information to the service center SS via a public circuit network PC, and a control device 34 that controls these various devices.

<The Analysis Server AS>

Figure 5:
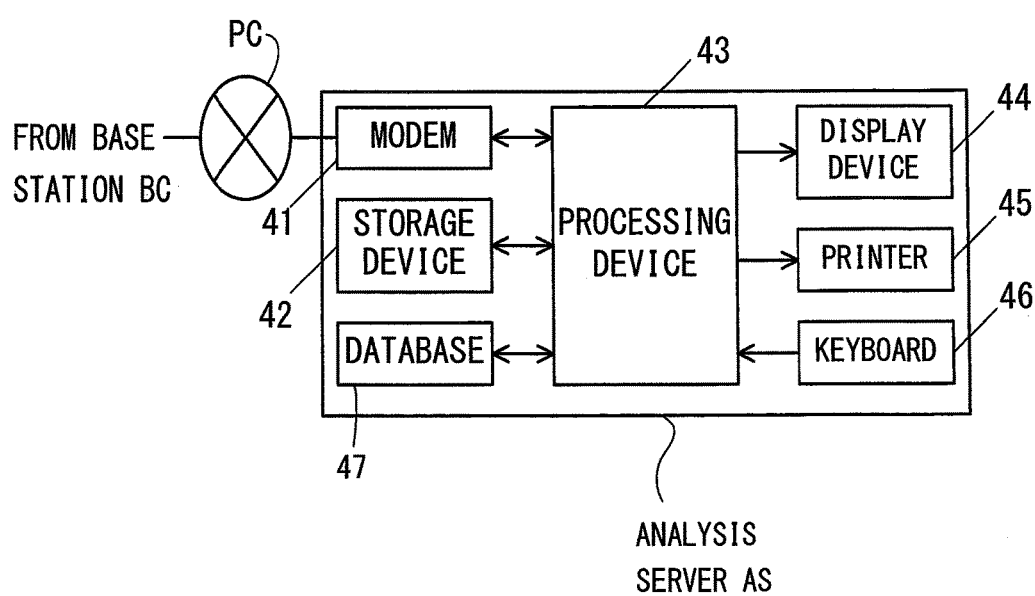
FIG. 5 is a block diagram showing an example of the structure of an analysis server that is provided to a service center.

FIG. 5 is a block diagram showing an example of the structure of the analysis server AS provided to the service center SS. This analysis server AS comprises a modem 41 that receives a signal sent from the base station BC via the public circuit network PC, a storage device 42 that stores the signal received by the modem 41, a processing device 43 that performs calculation processing of various types, a display device 44 that is connected to the processing device 43, a keyboard 46, and a database 47.

As well as storing the received signal described above, the storage device 42 stores past maintenance information (inspection history, repair history, and maintenance cost) for each of the hydraulic excavators. The maintenance cost, for example, may be expressed by sales of expendables and of exchange components. This maintenance information is sent via the public circuit network PC described above via the responsible companies, on the basis of the maintenance record made by the company responsible for selling each of the hydraulic excavators to a client (or that is in charge of executing a leasing contract). Instead of the responsible company, or in addition to the responsible company, it would be possible to arrange to classify the maintenance information by responsible branch office, by responsible sales outlet, or by responsible section.

On the basis of the information stored in the storage device 42, in other words on the basis of the information collected from the hydraulic excavators and the maintenance information collected from the responsible companies, the processing device 43 displays the management screen described above upon the display device 44.

<Structure of the Database>

FIG. 6 is a figure for explanation of an example of the database 47. The processing device 43 performs formatting according to a predetermined pattern upon the operational information collected from the hydraulic excavators and upon the maintenance information collected from the responsible companies, and stores the results in the database 47.

As items of hydraulic operational information, sequential numbers for identifying the hydraulic excavators (serial numbers), location information for the hydraulic excavators, IDs of the hydraulic excavators (vehicles), hour information from the hour meters of the hydraulic excavators, the maintenance costs generated by the hydraulic excavators, (including information about exchange components), and the cumulative number of warnings issued in respect of the hydraulic excavators, are collected together in the database 47.

Since date information is included in the information transmitted from the hydraulic excavators, accordingly the database 47 described above is set up so that the information therein can be searched by date. Due to this, when the week selection slider 18 (FIG. 2) described above is operated, information for the indicated week (information over seven days) is read out from the database 47 as appropriate. It should be understood that, while date information is attached to the information transmitted from the hydraulic excavators, it would also be acceptable for such date information not to be attached, but for the date and time of reception to be attached to this information when the information transmitted from the hydraulic excavators is received by the base station BC.

Moreover, the number of warnings is formatted so as to be read out according to the cause for which the warnings were issued. Due to this, for example, it is also possible to search for warnings that were issued for the reason of overheating (when the engine cooling water temperature was not a predetermined temperature), or for warnings that were issued for the reason of filter clogging.

<Explanation of the Management Screen>

By actuating the keyboard 46 of the analysis server AS or a mouse not shown in the figures, the manager of the service center SS can change the scale of the map 101 shown by way of example in FIG. 2, or can scroll it. As described above, the processing device 43 displays the symbols 103 through 107 that indicate the locations of the hydraulic excavators as superimposed over and combined with the map 101. Here, if a plurality of hydraulic excavators are operating in the same workplace, then, depending upon the scale of the map, a situation may occur in which the display positions of the symbols 103 through 107 are overlapped. In this case, for example, the processing device 43 may provide the combined display with the value of the hours information on the hour meter of that hydraulic excavator that is largest being superimposed on top. It should be understood that it would also be acceptable to arrange to provide a structure in which it is possible to change over the combined display so that the excavator whose maintenance cost is the largest is superimposed on top, or so that the excavator whose vehicle class is the largest is superimposed on top, or so that the excavator whose responsible company is a specified one is superimposed on top.

By actuating the keyboard 46 and/or the mouse (not shown in the figures), the manager can restrict the display according to any desired item in the restriction tool window 102. By doing this, it is possible to display the operational states upon the map 101 by year, to display the operational states upon the map 101 by the classes of the hydraulic excavators (vehicles), to designate an area upon the map 101 for display, to display the operational states upon the map 101 by responsible company, or to display the operational states upon the map 101 by hydraulic excavator type. By limiting the display only to symbols that correspond to some condition, it is possible, in a manner that is easy to understand, to display the symbols 103 through 107 that are superimposed upon and combined with the map 101 only to those that correspond to vehicles that agree with that condition.

It should be understood that, as an item for restriction, it would be acceptable to perform restriction according to the number of times that alarms have been generated, and to display the operational states of the hydraulic excavators upon the map 101 using symbols that vary according to the numbers of times that alarms have been generated. Moreover, it would also be acceptable to arrange to display the operational states of the hydraulic excavators upon the map 101 while separating them according to the causes of these alarms, such as the overheating or filter clogging or the like described above.

Moreover, it would also be possible to perform restriction related to the maintenance cost, and to display the operational states of the hydraulic excavators upon the map 101 with different symbols according to the amounts (bands or ranges) of money spent on them. Furthermore, it would also be acceptable to display the operational states of the hydraulic excavators upon the map 101 according to the components that have been exchanged.

For each year, by actuating the slider, it is also possible to vary the display of operational information by changing it in units of weeks. When the week selection slider 108 is, for example, actuated by being dragged with the mouse (not shown in the figures) from the twentieth week to the thirtieth week, then the operational information is sequentially displayed upon the map 101 one week at a time. Since, by doing this, the positions of the symbols 103 through 107 gradually shift over the map as the weeks pass, accordingly it is possible to display changes of the positions in which the hydraulic excavators were being used, or at what timings in the year (i.e. during which weeks) the operating hours were high (or were low), visually in a way that is easy to understand. Moreover, it is also possible to display in which areas and at what timings (i.e. in which weeks) the number of warnings issued was high, in a way that is easy to understand.

The correspondence relationship between the different display formats for the symbols 103 through 107 and the operating hours is displayed in a window 112 as a legend. And the number of hydraulic excavators (vehicles) corresponding to each operating hours band is displayed in a window 111. When, by actuating the mouse not shown in the figures, the manager clicks upon the display of operating hours bands in the window 111, it is also possible to perform limitation of the symbols 103 through 107 that are superimposed upon and combined with the map 101, so that only those symbols that indicate the corresponding operating hours band are displayed.

Figure 7:
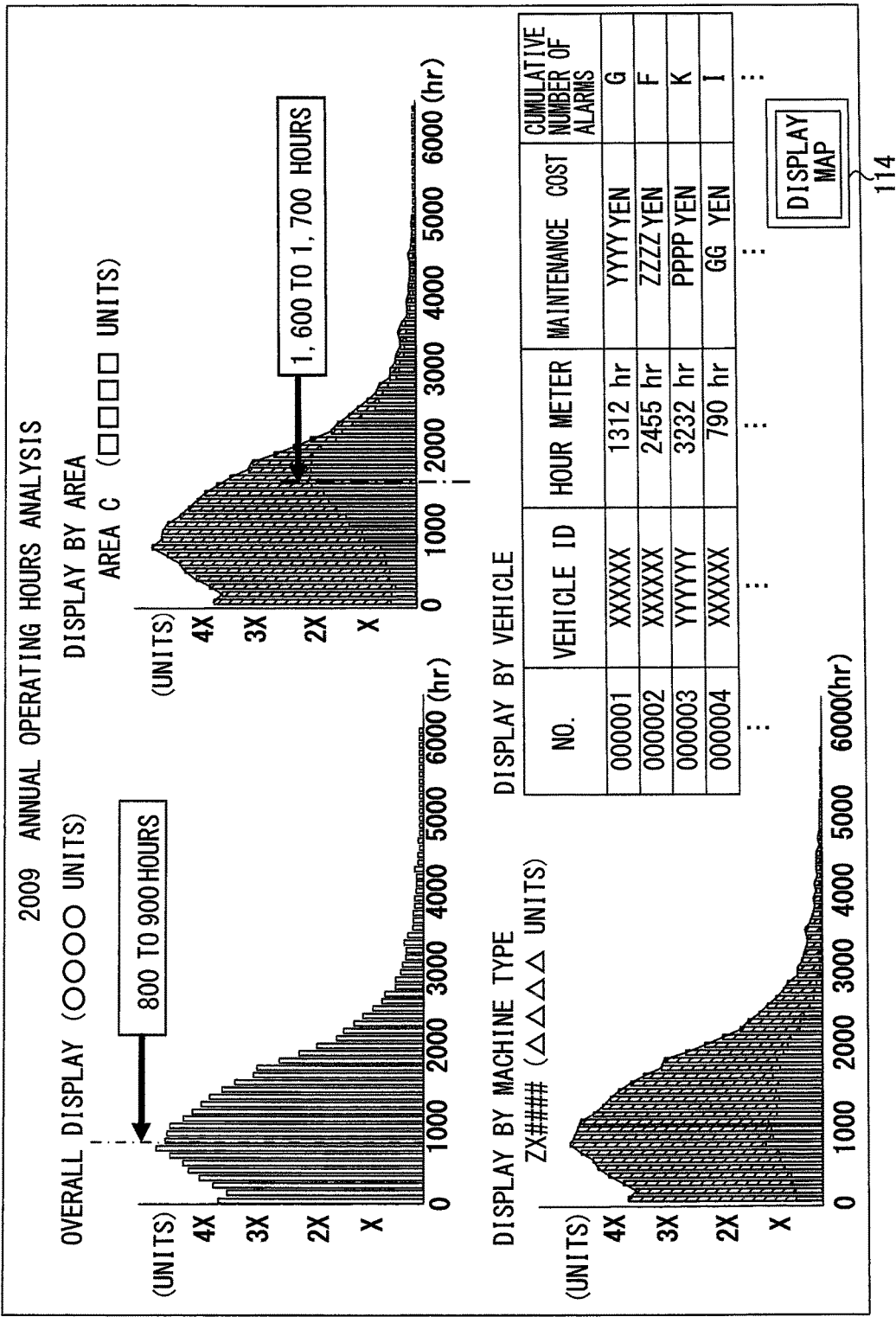
FIG. 7 is a figure showing an example of an analysis screen that specifies the operational states of the hydraulic excavators.

An analysis display button 113 is provided upon the map screen that is shown by way of example in FIG. 2. When the manager clicks upon this analysis display button 113 by actuating the mouse (not shown in the figures), then, instead of the map screen of FIG. 2, the processing device 43 displays an analysis screen like that shown by way of example in FIG. 7 upon the display device 44. FIG. 7 is a figure showing an example of this analysis screen indicating the operational states of the hydraulic excavators. In FIG. 7, there are displayed: an "overall display" showing the distribution of operating hours for all the hydraulic excavators operating during some one year period; a "display by area" that shows the distribution of operating hours for those hydraulic excavators, among all the hydraulic excavators, that are operating in "area C"; a "display by machine type (excavator type)" that shows the distribution of operating hours for those hydraulic excavators, among all the hydraulic excavators, that correspond to a predetermined machine type "ZX####"; and a "display by vehicle" that shows various items of information for each of the hydraulic excavators corresponding to the predetermined machine type "ZX####".

With "display by area" and "display by machine type", by providing a display of a distribution graph of all the hydraulic excavators superimposed and combined upon a background, it becomes simple and easy to investigate whether or not there is any disparity of the center of distribution in that area as compared with the center of the distribution of all the hydraulic excavators, and to analyze whether or not there is any disparity between the center of distribution for that machine type as compared to the center of distribution of all the hydraulic excavators.

According to this embodiment, it is possible to supply precise services for the construction vehicles, such as ascertaining an area in which, as compared to all the hydraulic excavators, a lot of vehicles are concentrated whose operating hours are high, increasing the strength of the service personnel in that area, dispatching service personnel as a priority to a location in which vehicles with high operating hours are concentrated, and so on. It should be understood that, in the state in which the map screen of FIG. 2 is displayed, the processing device 43 may also be caused to display an analysis screen such as that shown by way of example in FIG. 7 upon the display device 44, by the manager clicking upon any one of the symbols 103 through 107 by actuation of the mouse. In this case, only the hydraulic excavator (vehicle) corresponding to the symbol that has been clicked is displayed in the field of display by vehicle.

A map display button 114 is provided upon the analysis screen shown by way of example in FIG. 7. When the manager clicks upon this map display button 114 by actuating a mouse (not shown in the figures), the processing device 43 displays the map screen shown by way of example in FIG. 2 upon the display device 44, instead of the analysis screen of FIG. 7.

<Processing Executed by the Analysis Server AS>

The flow of processing executed by the processing device 43 of the analysis server explained above will now be explained with reference to the flow charts of FIGS. 8 and 9. When the processing device 43 (refer to FIG. 5) starts, it reads in a control program that has been stored in advance on a storage medium not shown in the figures (for example, in a storage device), and repeatedly executes the processing of FIG. 8.

Figure 8:
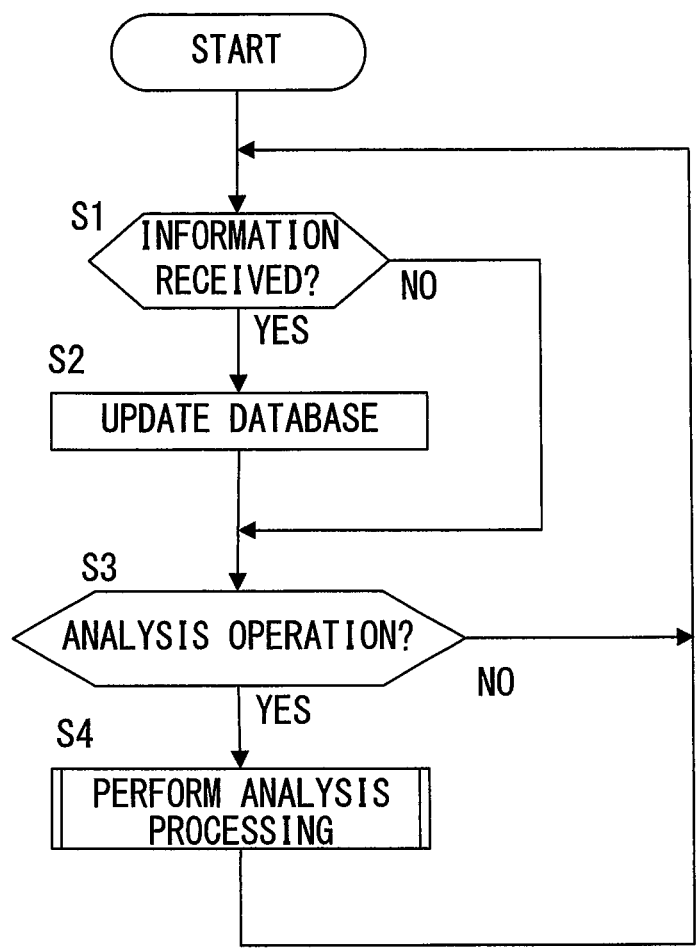
FIG. 8 is a flow chart for explanation of the flow of processing executed by a processing device of the analysis server.

In step S1 of FIG. 8, the processing device 43 makes a decision as to whether or not there is any information newly received from a hydraulic excavator. If new received information is present, then the processing device 43 reaches an affirmative decision in step S1 and the flow of control proceeds to step S2, whereas if no new received information is present, then a negative decision is reached in step S1 and the flow of control is transferred to step S3.

In step S2, the processing device 43 updates the database 47 on the basis of this new received information, and then the flow of control proceeds to step S3. In step S3, the processing device 43 makes a decision as to whether or not analysis actuation has been performed. If actuation for starting analysis processing has been performed by the manager by actuating the keyboard 46 or the mouse (not shown in the figures), then the processing device 43 reaches an affirmative decision in step S3 and the flow of control proceeds to step S4. But if no actuation for starting analysis processing has been performed, then the processing device reaches a negative decision in step S3, and the flow of control returns to step S1.

In step S4, the processing device 43 starts analysis processing that will be described hereinafter, and returns to step S1 after having executed that analysis processing. When returning to step S1, the processing described above is repeated.

The details of the analysis processing will now be explained with reference to the flow chart of FIG. 9. In step S11 of FIG. 9, the processing device 43 performs initial setting of the restriction conditions. In this initial setting, the area to be displayed upon the map screen shown by way of example in FIG. 2 is set, the company responsible for the hydraulic excavators to be displayed is set, the classe of hydraulic excavator (vehicle) to be displayed is set, the type (machine type) of the hydraulic excavators to be displayed is set, the year to be displayed is set, and the number of alarms for the hydraulic excavators to be displayed is set. The processing device 43 reads out from the storage device not shown in the figures the restriction conditions that were set by restriction operation the previous time that this program was run, and makes the initial settings described above. It should be understood that, if no previous restriction conditions are available, then specification for all of the hydraulic excavators is performed, in order for them all to be displayed.

In step S12, the processing device 43 searches the database 47 on the basis of the restriction conditions described above, and then the flow of control proceeds to step S13. In step S13, on the basis of the data that have been obtained by the search, the processing device 43 displays a map screen such as that shown by way of example in FIG. 2 upon the display device 44, and then the flow of control proceeds to step S14.

In step S14, the processing device 43 makes a decision as to whether or not restriction actuation has been performed. If an actuation signal has been inputted from the keyboard 46 or from the mouse (not shown in the figures) using the restriction tool window 102 described above, then the processing device 43 reaches an affirmative decision in step S14 and the flow of control proceeds to step S15. But if no such actuation signal has been inputted from the keyboard 46 or from the mouse (not shown in the figures), then the processing device 43 reaches a negative decision in step S14 and the flow of control is transferred to step S22.

In step S15, the processing device 43 searches the database again on the basis of the restriction conditions, and then the flow of control proceeds to step S16. In step S16, the processing device 43 updates the display upon the map screen on the basis of the data obtained after having searched again, and then the flow of control proceeds to step S17.

In step S17, the processing device 43 makes a decision as to whether or not a command has been issued for display of an analysis screen. If the analysis display button 113 (refer to FIG. 2) has been clicked by actuation of the mouse, or if one of the symbols 103 through 107 (refer to FIG. 2) upon the map 101 has been clicked, then the processing device 43 reaches an affirmative decision in step S17, and the flow of control proceeds to step S18. But if neither the analysis display button 113 (refer to FIG. 2) nor any one of the symbols 103 through 107 (refer to FIG. 2) upon the map 101 has been clicked, then the processing device 43 reaches a negative decision in step S17, and the flow of control returns to step S13.

In step S18, the processing device 43 displays an analysis screen such as that shown as an example in FIG. 7, and then the flow of control proceeds to step S19. In step S19, the processing device 43 makes a decision as to whether or not actuation for returning to the map screen has been performed. If the map display button 114 (refer to FIG. 7) has been clicked by actuation of the mouse, then the processing device 43 reaches an affirmative decision in this step S19, and the flow of control returns to step S13 and a map screen like the one shown by way of example in FIG. 2 is again displayed upon the display device 44. On the other hand, if the map display button 114 (refer to FIG. 7) has not been clicked, then the processing device 43 reaches a negative decision in this step S19, and the flow of control returns to step S18. If the flow of control returns to step S18, then display of the analysis screen is continued.

In step S22 to which control proceeds in the case of a negative decision in step S14 described above, the processing device 43 makes a decision as to whether or not actuation to change the scale has been performed. If actuation to change the scale has been performed, then the processing device 43 reaches an affirmative decision in step S22, and the flow of control proceeds to step S23. But if actuation to change the scale has not been performed, then the processing device 43 reaches a negative decision in step S22, and the flow of control is transferred to step S20.

In step S23, the processing device 43 sets the new scale, and then the flow of control returns to step S13, and a map screen after the change of scale is displayed upon the display device 44. And in the step S20 to which control proceeds in the case of a negative decision in step S22, the processing device 43 makes a decision as to whether or not termination actuation has been performed. If an actuation signal commanding termination has been inputted from the keyboard 46, then the processing device 43 reaches an affirmative decision in step S20, and the flow of control is transferred to step S21. But if no such actuation signal commanding termination has been inputted from the keyboard 46, then the processing device 43 reaches a negative decision in step S20, and the flow of control is transferred to step S13. When the flow of control returns to step S13, the processing described above is repeated.

Figure 9:
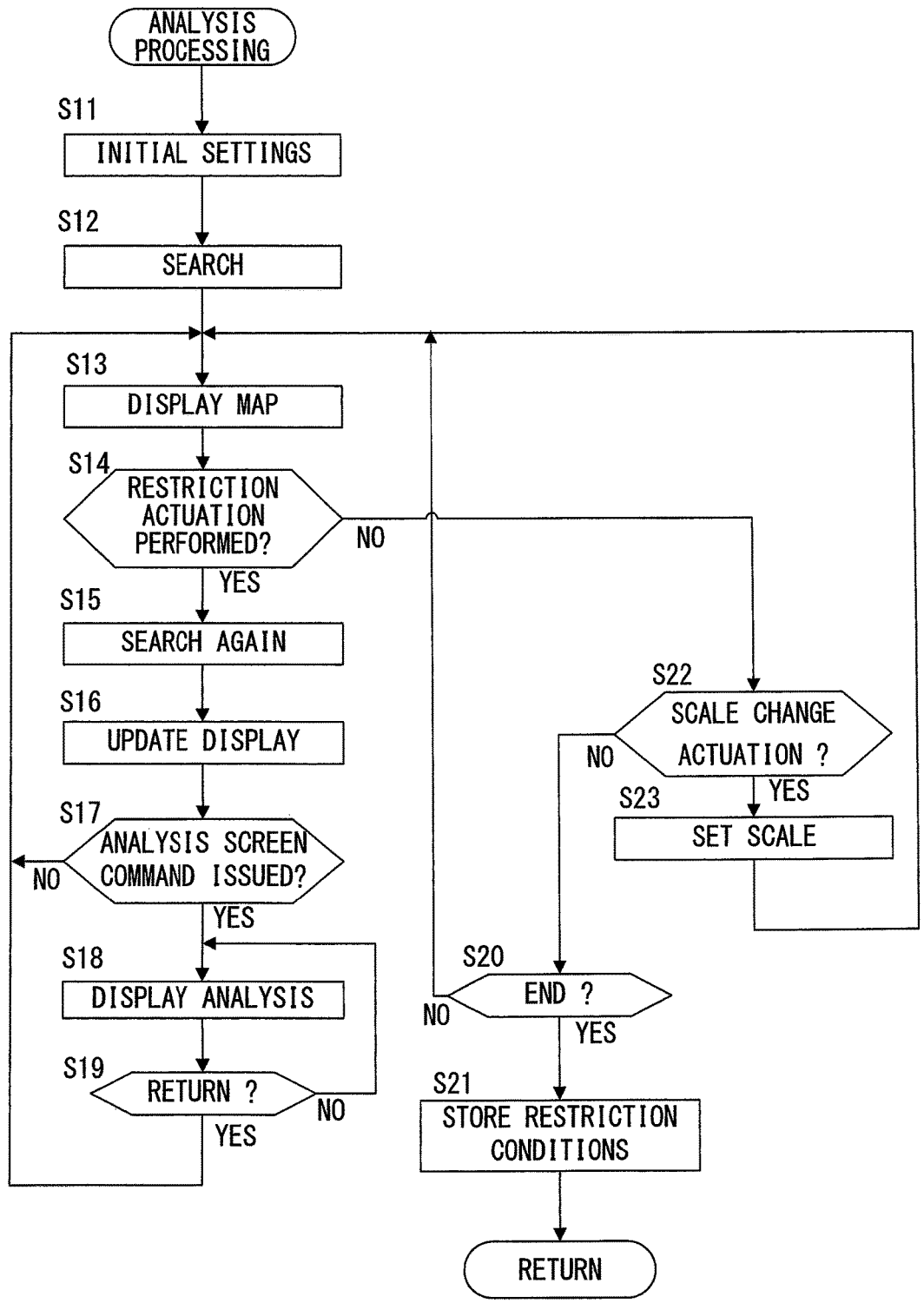
FIG. 9 is a flow chart for explanation of the details of analysis processing.

In step S23, the processing device 43 stores the restriction conditions that have been set in the storage device not shown in the figures, and then the processing of FIG. 9 terminates.

These restriction conditions that are stored are used during the initial setting the next time that processing is executed.

According to the embodiment explained above, the following operations and beneficial effects are obtained.

(1) Since this construction machine management system includes the modem 41 that acquires operational information specifying the position and the operational state of each of a plurality of construction machines, the processing device 43 that, on the basis of the operational information received by the modem 41, superimposes and combines upon the map 101 the symbols 103 through 107 showing the positions of each of the construction machines, the processing device 43 that displays upon the display device 44 a map image that has been superimposed and combined by the processing device 43, and the processing device 43 that changes the display formats of the symbols 103 through 107 according to the operational states, accordingly it is possible to display the information required for services to each of the vehicles in a manner that is easy to understand. Doing this is very helpful for supplying precise services to each individual vehicle.

(2) Since, with the construction machine management system described in (1) above, the operational information includes at least operating hours and maintenance costs, and it is arranged for the processing device 43 to change the display formats of the symbols 103 through 107 according to the operating hours or the maintenance costs, accordingly, by displaying those vehicles that have high operating hours and that need inspection in a manner that is easy to distinguish, or by displaying those vehicles whose maintenance costs are high in a manner that is easy to distinguish, this is helpful for supplying precise services to those vehicles, such as the dispatch of service personnel or the like.

(3) Since, with the construction machine management system described in (2) above, there is included the processing device 43 that restricts the corresponding construction machines to a predetermined hour band among the operating hours, or to predetermined costs among the maintenance costs, and since the processing device 43 superimposes and combines upon the map 101 only symbols 103 through 107 indicating those construction machines to which restriction has been made, accordingly it is possible to display this information for only those vehicles that match the conditions, in a manner that is easy to understand.

(4) Since, with the construction machine management system described in (3) above, the operational information further includes information specifying the types of the construction machines, the empty weights of the construction machines, the entities in charge of maintenance of the construction machines, the operating times of the construction machines, the areas in which the construction machines are located, and the number of warnings issued from the construction machines, since the processing device 43 restricts the corresponding construction machines on the basis of at least one of the types of information described above, and since the processing device 43 further superimposes and combines upon the map 101, only symbols 103 through 107 indicating those construction machines to which restriction has been made, accordingly it is possible to display this information for only those vehicles that match the conditions, in a manner that is easy to understand.

(5) Since, with the construction machine management system described in any of (1) through (4) above, the processing unit 43 superimposes and combines, over other symbols, symbols indicating construction machines for which the values denoting the operational states are greater, accordingly this is helpful for supplying precise services to those vehicles, such as the dispatch of service personnel as a priority or the like.

Variant Embodiment #1

While, in the explanation given above, an example was explained in which the operational information was collected from the hydraulic excavators to the analysis server AS of the service center SS, it would also be acceptable to arrange to provide the management server separately from the analysis server AS, and to collect the operational information from the hydraulic excavators to this management server. In the case of a first variant embodiment, at the time point that the analysis processing is started, the analysis server AS acquires information of the hydraulic excavators from an appropriate management server (for example during initial setting), and performs display of the management screen described above (i.e. the map screen of FIG. 2 or the analysis screen of FIG. 7). It should be understood that it would also be acceptable to provide a management server for each of a plurality of areas. In this case in which a management server is provided for each area, it would be possible for the analysis server AS to acquire the necessary information from the management server of an area that has become a subject of restriction.

Variant Embodiment #2

While, in the embodiment described above, the service center SS and the base station BC were provided separately, it would also be possible to provide these as one integrated structure.

Variant Embodiment #3

While, in the embodiment described above, hydraulic excavators were explained by way of example as representatives of construction machinery, the management system described above could also be applied to management of industrial vehicles such as loading shovels, large sized dump trucks, wheel loaders, or the like.

The above explanation only relates to one particular example; the present invention is not to be considered as being limited by the structure of the embodiment described above in any way. Other modes of realization that are considered to fall within the range of the technical concept of the present invention are also included within the range of the present invention.

The content of the disclosure of the following application, upon which priority is claimed, is hereby incorporated herein by reference: Japanese Patent Application 2012-108411 (filed on May 10, 2012).

REFERENCE SIGNS LIST

42: storage device
43: processing device
44: display device
46: keyboard
47: database
101: map
102: restriction tool window
103 through 107: symbols
108: week selection slide
109: number of operating units window
110: average operating hours window a1 through a3, b1 through b3, c1 through c3: hydraulic excavators
AS: analysis server
BC: base station
CS: communication satellite
SS: service center

The invention claimed is:

1. An industrial vehicle management system, comprising:
   a receiving device adapted to receive operational information that includes position information and operation hours for each of a plurality of industrial vehicles;
   a display device adapted to display information for each of the industrial vehicles;
   a storage device adapted to store map information of areas where the industrial vehicles operate and symbols respectively indicating each of the industrial vehicles, each symbol having a predetermined correspondence with a predetermined range of operation hours; and
   a processing device programmed to calculate the information to be displayed on the display device, based on the operational information and the map information stored in the storage device,
   wherein the processing device is further programmed to:
   generate a map image by superimposing the symbols on the map information at respective positions of each of the industrial vehicles based on the position information for each of the industrial vehicles, and display, on the display device, the map image and a restriction setting screen for selecting a restriction condition to restrict the symbols to be displayed on the map image on the basis of the operational information,
   wherein the map image and the restriction setting screen are simultaneously displayed on the display,
   wherein upon selection of the restriction condition on the restriction setting screen, generate a map image by superimposing the symbols in different display formats in accordance with the corresponding range of operation hours and that meet the restriction condition at respective positions of the industrial vehicles meeting the restriction condition, and display the generated map image on the display device, and
   wherein upon selection of a restriction condition relating to a certain time period in a past on the restriction setting screen, and upon selection of displaying analysis information, display, on the display device, a chart indicating distribution of operation hours for all the industrial vehicles operating in the certain time period in the past, and either a chart indicating a distribution of operating hours for the industrial vehicles by each area or a chart indicating a distribution of operating hours for the industrial vehicles by each machine type.

2. The industrial vehicle management system according to claim 1,
   wherein the processing device is further programmed to display, on the display device, a chart indicating distribution of operation hours for all the industrial vehicles operating in the certain time period in the past, a chart indicating a distribution of operating hours for the industrial vehicles by each area and a chart indicating a distribution of operating hours for the industrial vehicles by each machine type.

* * * * *